United States Patent
Mitchell et al.

(10) Patent No.: US 11,587,556 B2
(45) Date of Patent: Feb. 21, 2023

(54) METHOD OF RECOGNISING A SOUND EVENT

(71) Applicant: Audio Analytic Ltd, Cambridgeshire (GB)

(72) Inventors: Christopher James Mitchell, Cambridgeshire (GB); Sacha Krstulovic, Cambridgeshire (GB); Cagdas Bilen, Cambridgeshire (GB); Juan Azcarreta Ortiz, Cambridgeshire (GB); Giacomo Ferroni, Cambridgeshire (GB); Arnoldas Jasonas, Cambridgeshire (GB); Francesco Tuveri, Cambridgeshire (GB)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 406 days.

(21) Appl. No.: 16/594,624

(22) Filed: Oct. 7, 2019

(65) Prior Publication Data

US 2021/0104230 A1   Apr. 8, 2021

(51) Int. Cl.
| | | |
|---|---|---|
| *G10L 15/16* | (2006.01) | |
| *G10L 15/02* | (2006.01) | |
| *G10L 15/08* | (2006.01) | |
| *G06N 20/20* | (2019.01) | |
| *G06K 9/62* | (2022.01) | |

(Continued)

(52) U.S. Cl.
CPC .............. *G10L 15/16* (2013.01); *G06K 9/628* (2013.01); *G06N 3/0454* (2013.01); *G06N 3/084* (2013.01); *G06N 20/20* (2019.01); *G10L 15/02* (2013.01); *G10L 2015/081* (2013.01)

(58) Field of Classification Search
CPC ... G10L 15/16; G10L 15/02; G10L 2015/081; G10L 25/30; G10L 25/51; G10L 25/03; G06K 9/628; G06N 3/0454; G06N 3/084; G06N 20/20; G06N 3/088; G06N 3/0445
See application file for complete search history.

(56) References Cited

U.S. PATENT DOCUMENTS

| | | | | |
|---|---|---|---|---|
| 2019/0043489 | A1* | 2/2019 | Lopatka | G06K 9/4628 |
| 2021/0104230 | A1* | 4/2021 | Mitchell | G06N 3/0454 |

OTHER PUBLICATIONS

McLoughlin et al, Continuous robust sound event classification using time-frequency features and deep learning, Sep. 11, 2017, PLoS ONE 12(9):e0182309, pp. 1-19 (Year: 2017).*

* cited by examiner

*Primary Examiner* — Linda Wong
(74) *Attorney, Agent, or Firm* — Tarolli, Sundheim, Covell & Tummino LLP

(57) ABSTRACT

A method for recognising at least one of a non-verbal sound event and a scene in an audio signal comprising a sequence of frames of audio data, the method comprising: for each frame of the sequence: processing the frame of audio data to extract multiple acoustic features for the frame of audio data; and classifying the acoustic features to classify the frame by determining, for each of a set of sound classes, a score that the frame represents the sound class; processing the sound class scores for multiple frames of the sequence of frames to generate, for each frame, a sound class decision for each frame; and processing the sound class decisions for the sequence of frames to recognise the at least one of a non-verbal sound event and a scene.

19 Claims, 4 Drawing Sheets

(51) Int. Cl.
*G06N 3/04* (2023.01)
*G06N 3/084* (2023.01)

METHOD OF RECOGNISING A SOUND EVENT

FIELD OF THE INVENTION

This invention generally relates to recognising non-verbal sound events and/or scenes by processing audio data.

BACKGROUND

Background information on sound identification systems and methods can be found in the applicant's PCT application WO2010/070314.

SUMMARY

According to a first aspect there is provided a method for recognising at least one of a non-verbal sound event and a scene in an audio signal comprising a sequence of frames of audio data. The method may comprise for each frame of the sequence: processing the frame of audio data to extract multiple acoustic features for the frame of audio data. The method may further comprise for each frame of the sequence: classifying the acoustic features to classify the frame by determining, for each of a set of sound classes, a score that the frame represents the sound class. The method may further comprise processing the sound class scores for multiple frames of the sequence of frames to generate, for each frame, a sound class decision for each frame. The method may further comprise processing the sound class decisions for the sequence of frames to recognise the at least one of a non-verbal sound event and scene.

A non-verbal sound event and/or scene may be a sound resulting from an event and/or scene and/or action. Examples of a non-verbal sound event may be a baby crying, a gun shooting, a dog barking. A further example of a non-verbal sound event is recognising a presence of a person talking, in other words a method for recognising a non-verbal sound event and/or scene may include a method that comprises determining that a person is speaking (or other details such as when a person has started and stopped speaking, or determining that more than one person is speaking). A method for recognising a non-verbal sound event and/or scene may not comprise recognising and, for example transcribing, exact words of speech, such methods fall within speech recognition.

An audio signal may be an analogue or digital audio signal captured by a sound capturing device such as a microphone. If the audio signal is an analogue signal then the method may comprise converting the analogue signal into a digital signal using, for example, an Analog to Digital Converter (ADC). The sound capturing device may be a microphone array, if this is the case then multi-channel audio can be captured and may be used to obtain improved sound recognition results.

The audio signal may be defined as a sequence of frames. Each frame may cover approximately 0.032 s of sound sampled every 0.016 s. The sequence denotes that the frames have a chronological order. The frames may be samples taken at regular intervals from a continuous time series (such as the audio signal). As the samples (i.e. frames) may be taken at regular intervals, defined by a sampling rate, time may be equivalently expressed in standard time units (i.e., minutes, seconds, milliseconds etc.) or as a number of frames. For example, in a digital system where the sampling rate is 16 kHz, which means 16,000 samples per second, a duration of 16 milliseconds can be equivalently expressed as 256 samples: 0.016 seconds times 16,000 samples per second equals 256 samples.

The frames of audio data may contain time domain waveform samples or Fourier domain spectrum samples. The frames of audio data may comprise one or more time domain waveform samples or one or more Fourier domain spectrum samples Processing a frame of audio data may comprise processing one or more of a time domain waveform sample and a Fourier domain waveform sample, where the time domain waveform sample and Fourier domain waveform sample correspond to audio from a same point in time in the audio signal. The result of processing may be one or several vector(s) of acoustic features. Processing a frame of audio may comprise performing one or more signal processing algorithms on the frame of audio data. Additionally or alternatively, processing a frame of audio data may comprise using a regression method. The regression method may consist in feature learning. Feature learning may be implemented, e.g., by training an artificial neural network (ANN) to produce acoustic features. In such a case, the neural network may be trained to produce bottleneck features, i.e., features output by a bottleneck layer, where an embedding of a previously trained neural network model is an input to a further neural network.

A neural network for processing the frame of audio data may be trained as an auto-encoder. In this case, the neural network is trained to match input vectors to themselves, but the network has some particular structure, for example a constriction in the middle of the neural network or has a recursive structure. The particular structure can encode the frame of audio data into a number of acoustic features.

Extracting a variety of features is advantageous because it can provide for more accurate classification of the frame.

One or more of the extracted acoustic features may be a ideophonic feature such as an acoustic feature representing a level of 'beepiness' associated with a frame of audio data (other examples may be a level of 'suddenness' or 'harmonicity').

A single acoustic feature vector can comprise all of the extracted acoustic features for a frame.

The acoustic features are used to classify a frame. A frame is classified by determining a score, for each of a set of sound classes, that the frame represents the sound class. The score for a sound class may represent an indication that a non-verbal sound event and/or scene associated with the sound class occurred during the time period that the frame represents. A frame may be classified using polyphonic classification where a single input (i.e. one frame) can correspond to several overlapping non-verbal sound events and/or scenes. The scores associated with a frame do not have to be probabilities and do not have to sum to 1.

A sound class is a non-verbal sound that can be recognised from an audio signal by the described method. Sound classes can be representative of, indicators of, or associated with, non-verbal sound events and/or scenes, for example a sound class may be "baby crying", "dog barking" or "female speaking". Additionally or alternatively, sound classes can be representative of, indicators of, or associated with, audio scenes, where an audio scene is for example "railway station" or "family dinner". Sound classes can have various levels of precision in their definition, for example "loud crash", "anomaly" or "noisy room" are possible sound classes, which may be considered to be less focused than a sound class of 'baby crying'.

A non-verbal sound event may be referred to as an audio event. An audio event may be a manifestation of a sound class at a time and/or for a duration. For example, "smoke alarm sounding for 10 seconds" or "baby crying between 12:15 and 12:17 today" are examples of non-verbal sound events.

A sound scene may be referred to as an audio scene; a sound scene may be an environment characterized by a set of expected sounds or sound types. An audio scene may be recognised by recognising and processing a number of audio events. An audio scene may be indicative of a particular context. Examples of audio scenes are a "railway station" (which may be defined by a composite mixture of audio events such as train sounds, crowd sounds etc.) and a "family dinner" (defined by a composite mixture of audio events such as crockery sounds, conversations, chewing sounds etc.).

The set of sound classes may comprise one or more target sound classes and one non-target sound class. A target sound class is a sound class that the described system is configured to recognise (for example "baby crying", "dog barking" or "female speaking"). The non-target sound class is a sound class that comprises all sound classes that are not target sound classes. If there are no audio events and/or scenes that have a corresponding target sound class in a frame, then the frame will be classified as having a non-target sound class. The non-target sound class is a sound class that comprises all sound classes that are not target sound classes. If there are no audio event and/or scenes (that have a corresponding target sound class) in a frame then the frame will be classified as having a non-target sound class. The non-target sound class is representative of an absence of each of the one or more target sound classes.

For each of the set of sound classes, a score is determined that the frame represents the sound class. The score may identify a degree of affiliation that each frame has to a sound class. The score may be a probability, in which case a summation of the score for each of the set of sound classes equals one. If it is desirable to perform a method that outputs only a single sound class for each frame, then it can be advantageous to have the score as a probability. The score may be referred to as a class affiliation score where the score represents the level of affiliation that a frame has with a sound class. The score may be a distance or any other measurement that represents a level of affiliation that a frame has with a sound class. In other words, the score may not be a probability. Advantageously, if the score is not a probability then it is possible to perform a method that recognises sounds that overlap with respect to time because the method allows for determining more than one sound event and/or scene associated with a frame.

Sound class scores are processed to generate a sound class decision for a frame. This processing can output a single sound class decision for a frame by processing scores for multiple sound classes for a frame. This processing may output multiple sound class decisions for a frame by processing scores for multiple sound classes for a frame. Sound classes scores for multiple frames are processed in order to generate a sound class decision for a single frame.

A sound class decision is an indication that a frame is associated with a sound class. In other words, the sound class decision is an indication that the non-verbal sound event and/or scene that is represented by the sound class decision has occurred during the time spanned by the frame. To generate the sound class decision, long term temporal information is processed, for example, sound class scores for multiple frames may be processed to determine a sound class decision for a frame. The sound class decision may be a hard decision, for example the sound class decision may be a yes or a no that the frame is associated with one (or more) sound class (classes). The sound class decision may be a soft decision that represents a likelihood that a sound class has one or more sound classes associated with it. For this step, multiple sound class scores may be input and a sound class decision may be output, in this example, the sound class decision is the outputted sound class.

Sound class decisions are processed to recognise one or more non-verbal sound event and/or scene. Recognising a non-verbal sound event and/or scene may comprise generating an indication of a continuous sound event and/or scene. Such an indication may be output to a further device, or may be communicated to a user via a user interface.

The method may comprise recognising a non-verbal sound event and/or scene. More than a single sound event and/or scene may be recognised over a period of time. This may comprise recognising a start time and end time of a non-verbal sound event and/or scene.

Processing the sound class scores may include applying a temporal structure constraint to the sound class scores to generate the sound class decision. Applying the temporal structure constraint may comprise applying a consistency constraint to the sound class scores over a sequence of multiple frames. The consistency constraint may be a soft or hard constraint e.g. requiring that a specified number or proportion of the frames have a similar sound class score and/or the same sound class decision; or requiring that a consistency metric is satisfied for a sequence of frames; or processing the sound class scores of the sequence of frames using a process which is responsive to a history of the sound class scores. Thus generally applying the temporal structure constraint to a sequence of frames may comprise processing the sequence of frames to determine whether a constraint, i.e. the temporal structure constraint, is met.

Classifying the acoustic features may comprise classifying the frame of audio data using a set of first classifiers, and wherein applying the temporal structure constraint may comprise processing the sound class scores using a second classifier.

The second classifier may be a neural network.

Classifying the acoustic features may comprise classifying the frame of audio data using a set of first classifiers, and wherein applying the temporal structure constraint may comprise processing the sound class scores using a Viterbi optimal path search algorithm. The first set of classifiers may be referred to as sound classes. Examples of the first classifiers are a 'baby cry', a 'glass break' or 'dog bark'.

The set of first classifiers may comprise a set of neural network classifiers. The set of first classifiers may comprise a set of feedforward neural network classifiers.

Processing the frame of audio data to extract multiple acoustic features for the frame of audio data may comprise processing the frame of audio data using a feature extraction neural network to extract the acoustic features for the frame. The feature extraction neural network may be a sub-system of a of a neural network system comprising multiple distinct functional layers.

The multiple acoustic features may be extracted using a set of algorithms. The set of algorithms may be a set of signal processing algorithms.

The frame of audio data may comprise time domain audio data for a time window, and wherein processing the frame of audio data to extract the acoustic features for the frame of audio data may comprise transforming the frame of audio data into frequency domain audio data and/or determining a feature vector defining the acoustic features for the frame of audio data from the frequency domain audio data.

A neural network used for feature extraction may receive as an input any of: a waveform for the frame, frequency domain data for the frame, or a further transformation for the frame.

In other words, a neural network could be configured to: receive a waveform as an input; and output multiple acoustic features. A waveform may be transformed into a Fourier spectrum, a neural network may be configured to receive the Fourier spectrum and output the multiple acoustic features. A waveform may be operated on by signal processing algorithms (to produce, for example Mel-Frequency Cepstral coefficients), the neural network may be configured to: receive, as an input, the output of the signal processing algorithms; and output the multiple acoustic features.

Classifying the acoustic features to classify the frame may comprise concatenating the multiple acoustic features for the frame of audio data with multiple acoustic features for an adjacent frame of audio data in the sequence.

Processing the frame of audio data to extract the acoustic features for the frame of audio data may comprise determining a feature vector defining the acoustic features for the frame of audio data.

The frame of audio data may comprise time domain audio data for a time window. Processing the frame of audio data to extract the acoustic features for the frame of audio data may comprise transforming the frame of audio data into frequency domain audio data.

The method may comprise adjusting the sound class scores for multiple frames of the sequence of frames based on one or more of: knowledge about one or more of the sound classes; and knowledge about a sound environment in which the audio data was captured. The knowledge may be prior knowledge and may be received from an outside source. The knowledge about an environment in which the audio data was captured may be that a house, in which a sound recognising device is situated, is empty. The knowledge about one or more of the sound classes may be for example the relative probabilities of occurrence of the sound classes, for example glass break or smoke alarm sounds occurring less frequently than speech sounds. The knowledge about one or more of the sound classes may be for example the cost of making the wrong decision for certain sound classes, for example misdetecting one dog bark may be given a low cost because it is likely that the dog will bark again, whereas misdetecting a glass break has a high cost because the consequences of misdetecting, e.g., a burglar intrusion might be catastrophic. Such knowledge may be considered to be "external" or a priori knowledge because it is obtained from sources which come in addition to the audio signal. Such knowledge contains information of relevance to the likelihood of the recognised sound event and/or scene. The knowledge may have different sensor modality from sound.

Processing the sound class scores for multiple frames of the sequence of frames to generate, for each frame, one or several sound class decision(s) may comprise using an optimal path search algorithm across more than one frame. This processing can generate multiple class decisions for a frame, this may be a consequence of overlapping audio events and/or scenes. For example, a baby crying while a smoke alarm is sounding may lead to multiple class decisions for a frame: both a class decision indicating a baby crying and a class decision indicating a smoke alarm for the considered frame.

The optimal path search algorithm may be a Viterbi algorithm.

The Viterbi algorithm receives sound class scores for multiple frames as an input and outputs sound class decisions for the one or more frames. When a Viterbi algorithm is used, there exists a state for each of the sound classes. A transition matrix may be used to block or to favour transitions between particular states (i.e. between particular sound classes). This means that between sequential frames, a sound class decision may, for example, only move from a target sound class to a non-target sound class, or may be prohibited from moving from a first target sound class straight to a second target sound class. In other words, the transition matrix may influence transitions in a variety of ways, for example, forcing transitions rather than blocking them, or ensuring that all transitions are equiprobable.

Processing the sound class decisions for the sequence of frames to recognise the non-verbal sound event and/or scene may comprise determining a start and an end time of the non-verbal sound event and/or scene.

Processing the sound class scores for multiple frames of the sequence of frames to generate, for each frame, a sound class decision for each frame may comprise: filtering the sound class scores for the multiple frames to generate a smoothed score for each frame; and comparing each smooth score to a threshold to determine a sound class decision for each frame.

The frame-level classifications may be processed to generate event and/or scene indicators that are representative of a longer period of time than a sound class decision. The event and/or scene indicators may indicate that at least one of an event and a scene has occurred. The frame-level classifications may be processed to generate the audio event indicators by, for example:

grouping the sound class decisions for each frame into single long-term event and/or scene indicators having a start time, an end time and a duration;

discarding the event and/or scene indicators which are shorter than a threshold defined individually for each sound class. For example, a "baby cry" indicator may be discarded if it is shorter than 116 milliseconds/10 frames, or smoke alarm indicators can be discarded if they are shorter than 0.4 seconds/25 frames, where the duration thresholds can be set flexibly for each class;

merging the same sound class events and/or scene that intersect a particular time window into one single event and/or scene indicator, for example if two baby cry events happen within a 4 seconds interval then they can be merged into one event indicator, where the window duration (4 seconds in the above example) is a parameter which can be flexibly tuned.

According to another aspect there is provided a non-transitory data carrier carrying processor control code which when running on a device causes the device to perform any of the above method steps.

According to another aspect there is provided a computer system configured to implement any of the above method steps.

According to another aspect there is provided a consumer electronic device comprising the above computer system.

According to another aspect there is provided a system for recognising at least one of a non-verbal sound event and/or scene in an audio signal. The audio signal may comprise a sequence of frames of audio data. The system may comprise a microphone to capture the audio data. The system may comprise a microphone array to capture the audio data. The system may comprise one or more processors. The system may be configured to, for each frame of the sequence, process the frame of audio data to extract multiple acoustic features for the frame of audio data. The system may be configured to, for each frame of the sequence, classify the acoustic features to classify the frame by determining, for each of a set of sound classes, a score that the frame represents the sound class. The system may be configured to process the sound class scores for multiple frames of the sequence of frames to generate, for each frame, a sound class decision for each frame. The system may be configured to process the class decisions for the sequence of frames to recognise the at least one of a non-verbal sound event and scene.

According to another aspect there is provided a sound recognition device for recognising at least one of a non-verbal sound event and scene in an audio signal. The audio signal may comprise a sequence of frames of audio data. The sound recognition device may comprise: a microphone to capture the audio data. The sound recognition device may comprise a processor configured to: receive the audio data from the microphone. The processor may be configured to, for each frame of the sequence, process the frame of audio data to extract multiple acoustic features for the frame of audio data. The processor may be configured to, for each frame of the sequence, classify the acoustic features to classify the frame by determining, for each of a set of sound classes, a score that the frame represents the sound class. The processor may be configured to process the sound class scores for multiple frames of the sequence of frames to generate, for each frame, a sound class decision for each frame. The processor may be configured to process the class decisions for the sequence of frames to recognise the at least one of a non-verbal sound event and scene. A microphone array may be used to capture the audio data.

In a related aspect there is provided a non-transitory data carrier carrying processor control code which when running on a device causes the device to operate as described.

It will be appreciated that the functionality of the devices we describe may be divided across several modules and/or partially or wholly implemented in the cloud. Alternatively, the functionality may be provided in a single module or a processor. The or each processor may be implemented in any known suitable hardware such as a microprocessor, a Digital Signal Processing (DSP) chip, an Application Specific Integrated Circuit (ASIC), Field Programmable Gate Arrays (FPGAs), a Graphical Processing Unit (GPU), a Tensor Processing Unit (TPU), and so forth. The or each processor may include one or more processing cores with each core configured to perform independently. The or each processor may have connectivity to a bus to execute instructions and process information stored in, for example, a memory.

The aforementioned neural networks used to recognise a non-verbal sound event and/or scene may be trained separately. Alternatively, the aforementioned neural networks used to recognise a non-verbal sound event and/or scene may be considered as a neural network system that can be trained (i.e., back-propagated) end-to-end. This may be considered to be a single neural network or may be considered to be a chain of modules trained jointly.

The invention further provides processor control code to implement the above-described systems and methods, for example on a general purpose computer system, a digital signal processor (DSP) or a specially designed math acceleration unit such as a Graphical Processing Unit (GPU) or a Tensor Processing Unit (TPU). The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit), FPGA (Field Programmable Gate Array), GPU (Graphical Processing Unit), TPU (Tensor Processing Unit) or NPU (Neural Processing Unit), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system. The invention may comprise performing a DNN operation on a GPU and/or an AI accelerator microprocessor, and performing other operations on a further processor.

These and other aspects will be apparent from the embodiments described in the following. The scope of the present disclosure is not intended to be limited by this summary nor to implementations that necessarily solve any or all of the disadvantages noted.

BRIEF DESCRIPTION OF DRAWINGS

Embodiments of the invention will be described, by way of example, with reference to the accompanying drawings, in which.

DETAILED DESCRIPTION OF THE DRAWINGS

Figure 1:
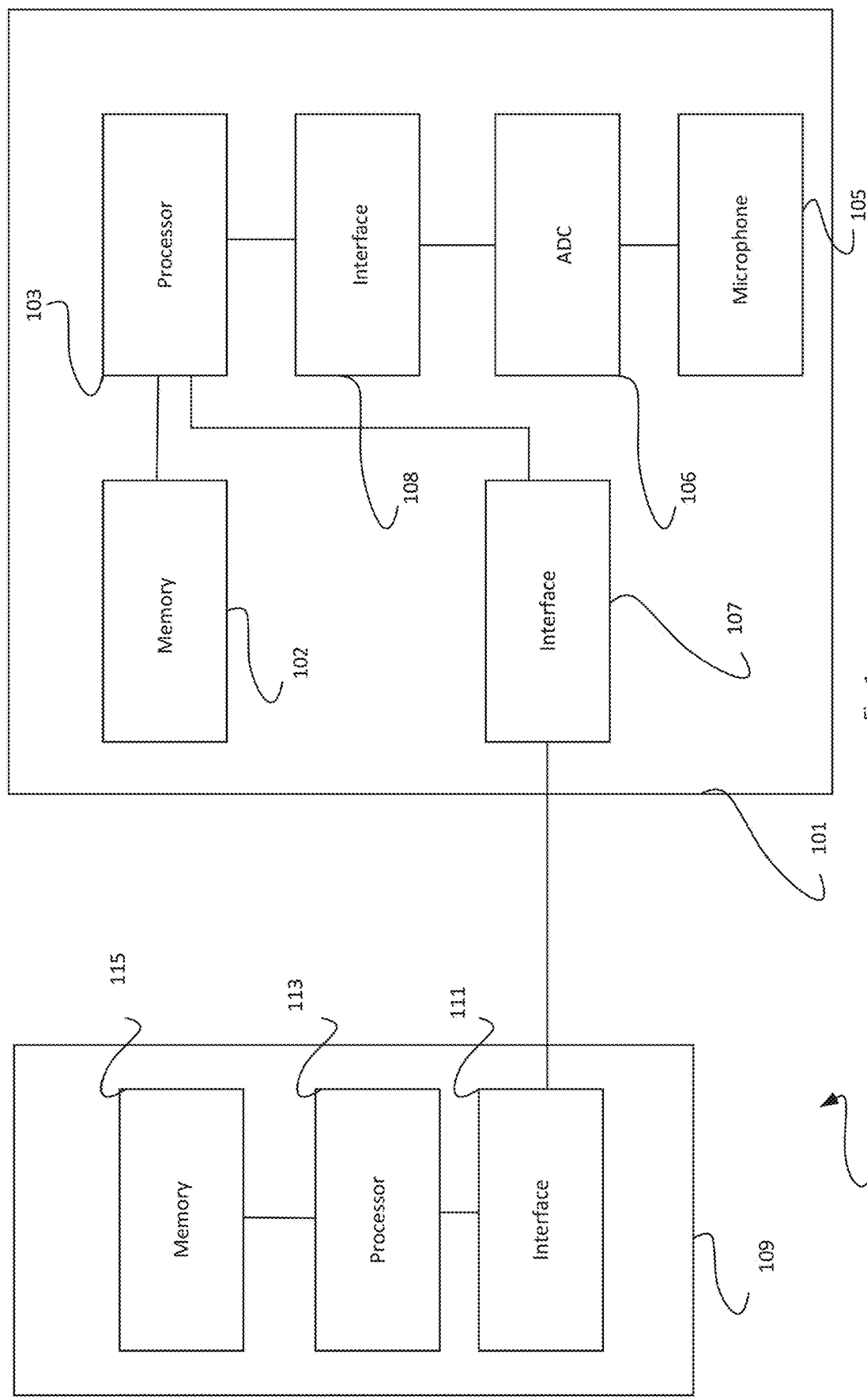
FIG. 1 shows a block diagram of a system 100 configured to recognise a non-verbal sound event and/or scene.

FIG. 1 shows a system 100 configured to recognise a non-verbal sound event and/or scene.

The system comprises a device 101. The device 101 may be any type of electronic device. The device 101 may be a consumer electronic device. For example the consumer electronic device 101 may be, a smartphone, a headphone, a smart speaker, a car, a digital personal assistant, a personal computer, a tablet computer. The device 101 comprises a memory 102, a processor 103, a microphone 105, an analogue to digital converter (ADC) 106, an interface 108 and an interface 107. The processor is in connection to: the memory 102; the microphone 105; the analogue to digital converter (ADC) 106; interface 108; and the interface 107. The processor 103 is configured to recognise a non-verbal sound event and/or scene by running computer code stored on the memory 102. For example, the processor 103 is configured to perform the method 200 of FIG. 2. The processor 103 may comprise one or more of a CPU module and a DSP module. The memory 102 is configured to store computer code that when executed by the processor 103, causes the processor to recognise a non-verbal sound event and/or scene.

The microphone 105 is configured to convert a sound into an audio signal. The audio signal may be an analogue signal, in which case the microphone 106 is coupled to the ADC 106 via the interface 108. The ADC 106 is configured to convert the analogue audio signal into a digital signal. The digital audio signal can then be processed by the processor 103. In embodiments, a microphone array (not shown) may be used in place of the microphone 105.

Although the ADC 106 and the microphone 105 are shown as part of the device 101, one or more of the ADC 106 and the microphone 105 may be located remotely to the device 101. If one or more of the ADC 106 and the microphone 105 are located remotely to the device 101, the processor 103 is configured to communicate with the ADC 106 and/or the microphone 105 via the interface 108 and optionally further via the interface 107.

The processor 103 may further be configured to communicate with a remote computing system 109. The remote computing system 109 is configured to recognise a non-verbal sound event and/or scene, therefore the processing steps required to recognise a non-verbal sound event and/or scene may be spread between the processor 103 and the processor 113. The remote computing system comprises a processor 113, an interface 111 and a memory 115. The interface 107 of the device 101 is configured to interact with the interface 111 of the device 109 so that the processing steps required to recognise a non-verbal sound event and/or scene may be spread between the processor 103 and the processor 113.

Figure 2:
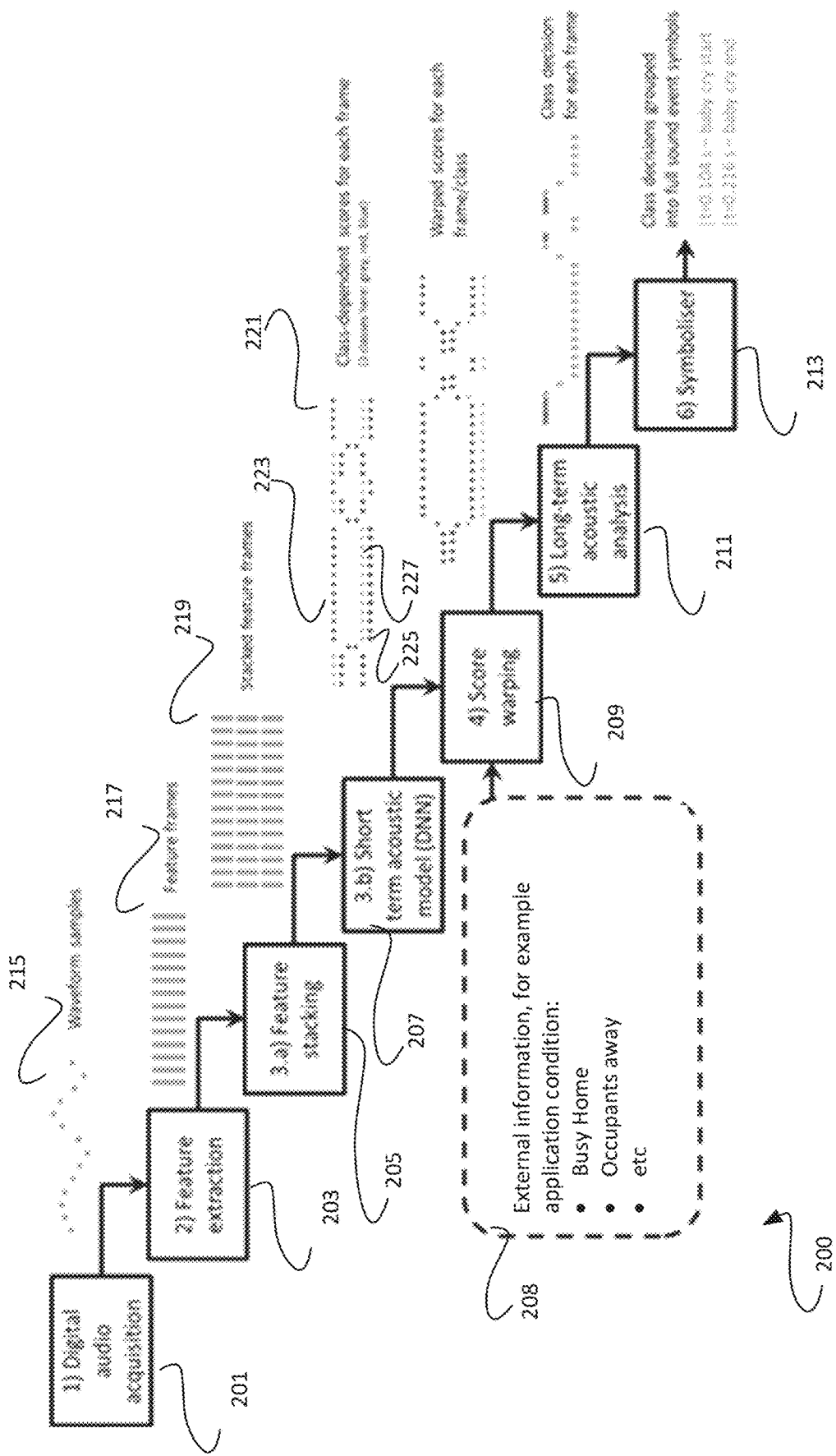
FIG. 2 shows a schematic flow diagram of a method 200 for recognising a non-verbal sound event and/or scene.

FIG. 2 shows a method 200 for recognising a non-verbal sound event and/or scene. The method 200 can be performed by the processor 103 in FIG. 1, or can be split between several processors, for example processors 103 and 113 in FIG. 1.

A step 201 shows acquiring a digital audio sample 215. The audio sample may have been acquired by a microphone, for example microphone 105 of FIG. 1. The audio sample 215 is then converted from an analogue sample to a digital sample by an analogue to digital converter, for example by the analogue to digital converter (ADC) 106 in FIG. 1. The processor 103 is configured to receive the digital sample from the ADC 106 via an interface 108. The microphone 105 and analogue-to-digital (ADC) converter 106 may together perform step 201 to deliver digital audio samples to the processor 103 via the interface 108, for example a serial interface such as I2C. The sampling frequency may be 16 kHz, this means that 16,000 audio samples are taken per second.

The digital audio sample 215 is grouped into a series of 32 ms long frames with 16 ms long hop size. If the sampling frequency is 16 Khz, then this is equivalent to the digital audio sample 215 being grouped into a series of frames that comprise 512 audio samples with a 256 audio samples-long hop size.

Once the digital audio sample 215 has been acquired, feature extraction is performed on the frames of the digital audio sample 215, as shown in the step 203. The feature extraction 203 results in a sequence of feature frames 217. The feature extraction step 203 comprises transforming the digital audio sample 215 into a series of multidimensional feature vectors (i.e. frames), for example emitted every 16 ms. The feature extraction of step 203 may be implemented in a variety of ways.

One implementation of feature extraction step 203 is to perform one or more signal processing algorithms on the frames of the digital audio sample 215. An example of a signal processing algorithm is an algorithm that processes a power spectrum of the frame to extract a spectral flatness value for the frame. A further example is a signal processing algorithm that extracts harmonics and their relative amplitudes from the frame.

An additional or alternative implementation of the feature extraction step 203 is to use a Deep Neural Network (DNN) to extract a number of acoustic features for a frame. A DNN can be configured to extract audio feature vectors of any dimension. A bottleneck DNN embedding or any other appropriate DNN embedding may be used to extract acoustic features. Here a neural network bottleneck may refer to a neural network which has a bottleneck layer between an input layer and an output layer of the neural network, where a number of units in a bottleneck layer is less than that of the input layer and less than that of the output layer, so that the bottleneck layer is forced to construct a generalised representation of the acoustic input.

The feature vector stacking step 205 is an optional step of the method 200. The feature vector stacking step 205 comprises concatenating the acoustic feature vectors 217 into larger acoustic feature vectors 219. The concatenation comprises grouping adjacent feature vectors into one longer (i.e. a higher dimensional) feature vector.

For example, if an acoustic feature vector comprises 32 features, the feature vector stacking step 205 may produce a 352 dimension stacked feature vector by concatenating an acoustic feature vector with 5 acoustic feature vectors before and after the considered acoustic feature vector (352 dimensions=32 dimensions×11 frames, where 11 frames=5 preceding acoustic feature vector+1 central acoustic feature vector+5 following acoustic feature vectors).

An alternative example of the feature vector stacking step 205 would be to stack 15 acoustic feature vectors before and after a central acoustic feature vector, where an original acoustic feature vector having 43 features would produce a stacked acoustic feature vector with 1333 dimensions (1333d=43d×31 acoustic feature vectors, where 31 acoustic feature vectors=15 before+1 central+15 after).

The acoustic modelling step 207 comprises classifying the acoustic features to classify the frame by determining, for each of a set of sound classes, a score that the frame represents the sound class. The acoustic modelling step 207 comprises using a deep neural network (DNN) trained to classify each incoming stacked or non-stacked acoustic feature vector into a sound class (e.g. glass break, dog bark, baby cry etc.). Therefore, the input of the DNN is an acoustic feature vector and the output is a score for each sound class. The scores for each sound class for a frame may collectively be referred to as a frame score vector. For example, the DNN used in the step 207 is configured to output a score for each sound class modelled by the system every 16 ms.

An example DNN used in step 207 is a feed-forward fully connected DNN having 992 inputs (a concatenated feature vector comprising 15 acoustic vectors before and 15 acoustic vectors after a central acoustic vector=31 frames×32 dimensions in total). The example DNN has 3 hidden layers with 128 units per layer and RELU activations.

Alternatively, a convolutional neural network (CNN), a recurrent neural network (RNN) and/or some other form of deep neural network architecture or combination thereof could be used.

A schematic example of an output of the DNN is shown at 221. In this example, there are three different sound classes represented by three colours: grey (227), red (223) and blue (225). The horizontal axis represents time and the vertical axis represents a value of a score (where a downward vertical direction represents a high score). Each dot is a score value corresponding to a frame of audio data.

A score warping step 209 is an optional step that follows 207. In step 209, the scores are reweighted according to probabilities learned from application-related data. In other words, the scores output by the DNN in step 207 are adjusted based on some form of knowledge other than the audio data acquired in step 201. The knowledge may be referred to as external information, examples of such external information can be seen at 208.

As examples, the score warping 209 may comprise the following method: using prior probabilities of sound event and/or scene occurrence for a given application to reweight one or more scores. For example, for sound recognition in busy homes, the scores for any sound class related to speech events and/or scenes would be weighted up. In contrast, for sound recognition in unoccupied homes, the scores for any sound class related to speech events and/or scenes would be weighted down.

Long-term acoustic analysis is performed at step 211. The long-term acoustic analysis performed at step 211 comprises processing the sound class scores for multiple frames of the sequence of frames to generate, for each frame, a sound class decision for each frame. The long-term acoustic analysis performed at step 211 outputs frame-level classification decisions after integrating longer term temporal information, typically spanning one or several seconds, into the frame-level scoring.

As an example, if there are four sound classes: A, B, C and D, the long-term acoustic analysis performed at step 211 will comprise receiving a sequence of vectors. Each vector would have four dimensions, where each dimension represents a (optionally reweighted) score for a class. The long-term acoustic analysis performed at step 211 comprises processing the multiple vectors that represent a long-term window, typically 1.6 second/100 score values long context window. The long-term acoustic analysis performed at step 211 will then output a series of classification decisions for each frame (i.e. the output will be A, B, C or D for each frame, rather than 4 scores for each frame). The long-term acoustic analysis performed at step 211 therefore uses information derived from frames across a long-term window.

The long-term acoustic analysis can be used in conjunction with external duration or co-occurrence models. For example:
  Transition matrices can be used to impart long-term information and can be trained independently of Viterbi. Transition matrices are an example of a co-occurrence model and also implicitly a duration model. Co-occurrence models comprise information representing a relation or an order of events and/or scenes.
  An explicit model of duration probabilities can be trained from ground truth labels (i.e. known data), for example fitting a Gaussian probability density function on the durations of one or several baby cries as labelled by human listeners. In this example, a baby cry may last between 0.1 s and 2.5 s and be 1.3 s long on average. More generally, the statistics of duration can be learned from external data. For example, from label durations or from a specific study on a duration of a specific sound event and/or scene.
  Many types of model can be used as long as they are able to generate some sort of class-dependent duration or co-occurrence score/weight (e.g., graphs, decision trees etc.) which can, for example, be used to rescore a Viterbi path(s), or alternatively, be combined with the sound class scores by some method other than the Viterbi algorithm across the long term, for example across a sequence of score frames spanning 1.6 s.

Examples of the long-term acoustic analysis performed at step 211 are given below, where the long-term acoustic analysis may thus apply a temporal structure constraint.
  Score smoothing and thresholding
  Viterbi optimal path search
  a recurrent DNN trained to integrate the frame decisions across a long-term window.

In more detail:

a) Score Smoothing and Thresholding Across Long Term Window

Median filtering or some other form of long-term low-pass filtering (for example a moving average filter) may be applied to the score values spanned by the long-term window. The smoothed scores may then be thresholded to turn the scores into class decisions, e.g., when a baby cry score is above the threshold then the decision for that frame is baby cry, otherwise the decision is world ("not a baby"). There is one threshold per class/per score.

b) Viterbi Optimal Path Search Across a Long Term Window

The input of the using the Viterbi algorithm to perform step 211 comprises:
  A state-space definition: there are S states where each state (s_i) is a sound class, for example: s_0=world; s_1=baby_cry; s_2=glass_break; etc. In one configuration there are 6 states however, in general there are as many states as there are classes to be recognised plus an extra state representing all other sounds (labelled as a 'world' class, (i.e. a non-target sound class), in the above).
  An array of initial probabilities: this is a S-sized array, where the i-th element is the probability that the decoded sequence starts with state i. In an example, these probabilities are all equal (for example, all equal to 1/S).
  A transition matrix A: this is a S×S matrix where the element (i, j) is the probability of moving from state i to state j. In an example configuration, this matrix is used to block transitions between target classes, for example, the probabilities of the row 0 (world class) are all greater than zero, which means a state can move from world to all other target classes. But, in row 1 (baby cry) only columns 0 and 1 are non-zero, which means that from baby cry the state can either stay in the baby cry state or move to the world state. Corresponding rules apply for the other rows.
  An emission matrix: this is a N×S matrix where the element (i, j) is the score (given by the acoustic model, after warping) of observing class j at the time frame i. In an example, N is equal to 100. In this example, the time window is 100 frames long (i.e. 1.6 seconds) and it moves with steps of 100 frames, so there is no overlap.

In other words, every time that the Viterbi algorithm is called, the Viterbi algorithm receives as an input, for example, 100 sound class scores and outputs 100 sound class decisions.

The settings are flexible, i.e., the number of frames could be set to a longer horizon and/or the frames could overlap.

Transition matrices can be used to forbid the transition between certain classes, for example, a dog bark decision can be forbidden to appear amongst a majority of baby cry decisions.

c) DNN Across a Long-Term Window

Examples of a DNN used to perform the long-term acoustic analysis performed at step 211 are:

A long short-term memory recurrent neural network (LSTM-RNN) with 101 stacked frame score vectors (50 frames before and after a target frame), where score frame vectors contain 6 scores (one for each of 6 classes) as input. Thus, the input size is a 101 by 6 tensor. The rest of the DNN comprises 1 LSTM hidden layer with 50 units, hard sigmoid recurrent activation, and tanh activation. The output layer has 6 units for a 6-class system.

A gated recurrent units RNN (GRU-RNN): the input size is similarly a 101 by 6 tensor, after which there are 2 GRU hidden layers with 50 units each, and tanh activation. Before the output layer a temporal max pooling with a pool size of 2 if performed. The output layer has 6 units for a 6-class system.

Long-term information can be inflected by external duration or co-occurrence models, for example transition matrices in case c) of using a Viterbi optimal path search, or inflected by an external model made by learning the typical event and/or scene lengths, for example probabilities of event and/or scene duration captured by some machine learning method, typically DNNs.

At the step 213, the sound class decisions for a sequence of frames are processed to recognise a non-verbal sound event and/or scene. In an example, the sound class decisions for multiple frames are input and an indication of one or more non-verbal sound events and/or scenes are output. Examples of how step 213 may be performed are explained below, one or more of the below examples may be implemented in the step 213:

a) the sound class decisions for each frame may be grouped into long-term event and/or scene symbols with a start time, an end time and a duration;
b) discarding a sequence of sound class decisions of the same class which are shorter than a sound event and/or scene duration threshold defined individually for each sound class. For example: a sequence of "baby cry" sound class decisions can be discarded if the sequence of "baby cry" sound class decisions are collectively shorter than 116 milliseconds (which is approximately equivalent to 10 frames); a sequence of "smoke alarm" sound class decisions can be discarded if the sequence of "smoke alarm" sound class decisions are collectively shorter than 0.4 seconds (which is approximately equivalent to 25 frames). The sound event and/or scene duration thresholds can be set manually for each class;
c) merging multiple non-verbal sound events and/or scenes of the same sound class that intersect a particular time window into one single non-verbal sound event and/or scene. For example, if two "baby cry" non-verbal sound events and/or scenes are determined to happen within a 4 seconds interval then they are merged into one a single "baby cry" non-verbal sound events and/or scenes, where the window duration (4 seconds in the above example) is a parameter which can be manually tuned. The window duration can be different for each sound class.

Figure 3:
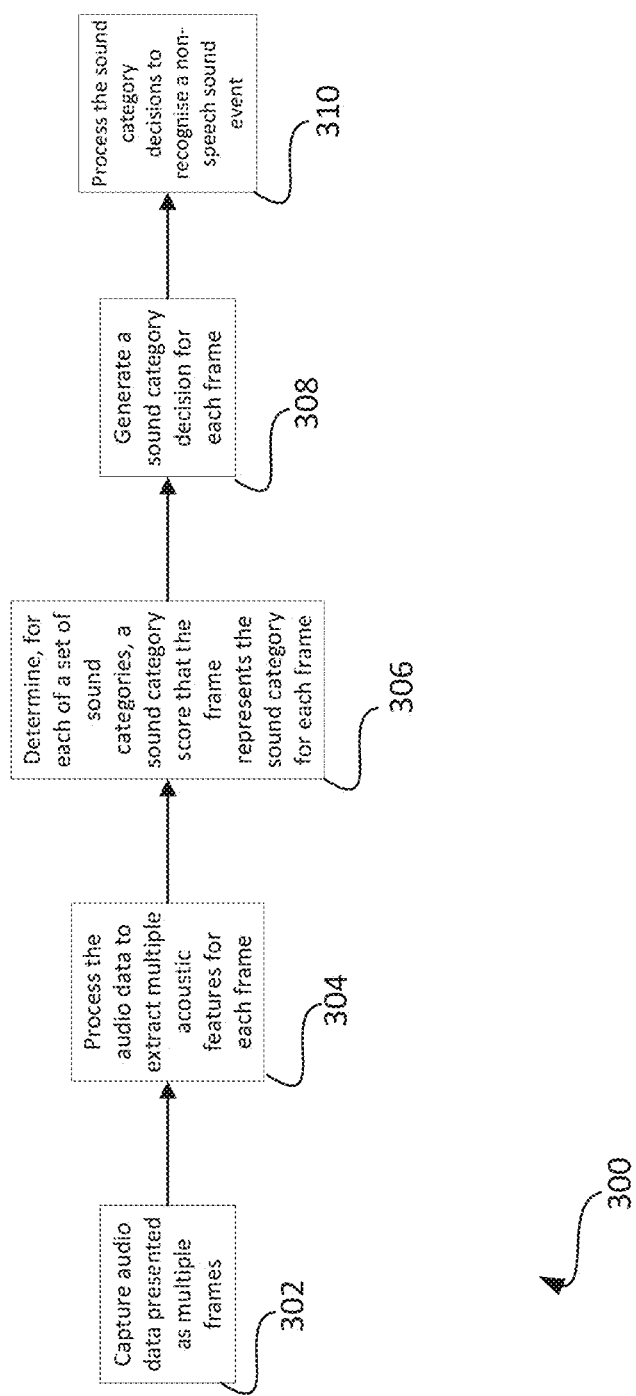
FIG. 3 shows a process 300 for recognising a non-verbal sound event and/or scene using the system of FIG. 2.

FIG. 3 shows a process 300 for recognising a non-verbal sound event and/or scene using the system of FIG. 2.

The first step (302) of the process 300 is to capture audio data comprising multiple frames. The audio data may be captured by the microphone 105 and processed using the ADC 106. The processed audio data is output from the ADC 106 to the processor 103 via the interface 108. The processed audio data may be considered as audio data.

At step 304 the audio data is processed to extract multiple acoustic features for each frame.

At step 306, for each of a set of sound classes, a sound class score that the frame represents the sound class for each frame is determined. Step 306 may comprise classifying the acoustic features to classify the frame by determining, for each of a set of sound classes, a score that the frame represents the sound class.

The next step (308) of the process 300 is to generate a sound class decision for each frame. This is performed by processing the sound class scores for multiple frames of the sequence of frames to generate, for each frame, a sound class decision for each frame.

The next step of the process 300 is to process (step 310) the sound class decisions to recognise a non-speech sound event and/or scene.

In response to recognising a non-speech sound event and/or scene, the system may optionally output a communication to a user device or a further computing device. The system may provide a visual, acoustic, or other indicator in response to recognising a non-speech sound event and/or scene.

Figure 4:
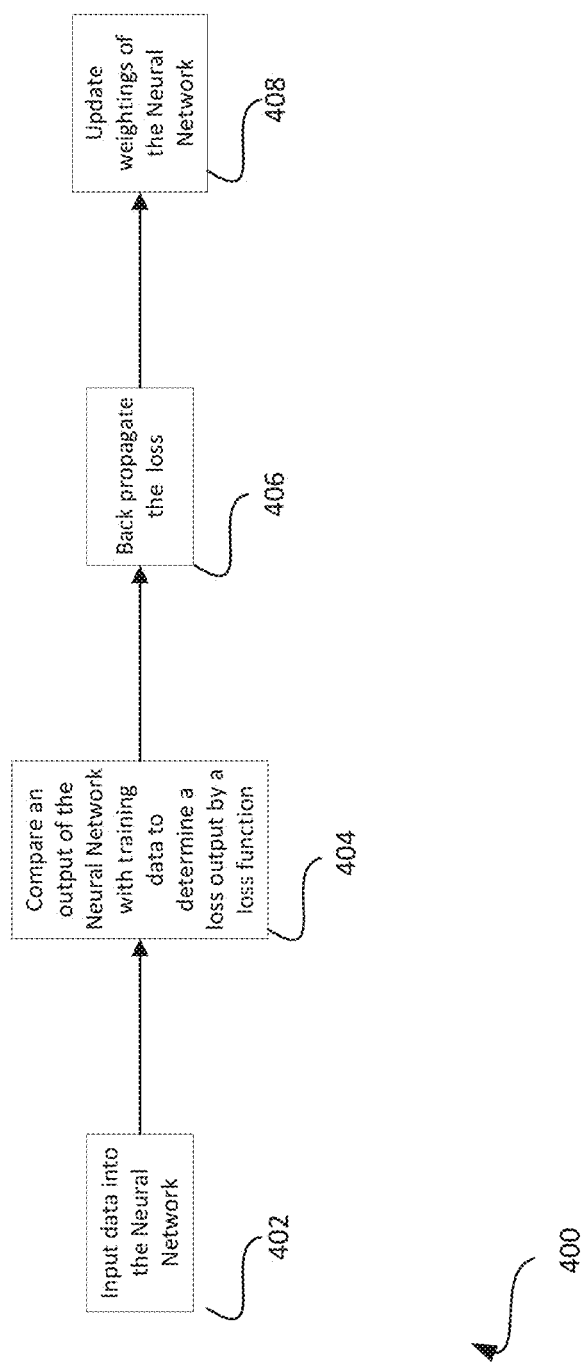
FIG. 4 shows a process 400 for training the machine learning models (e.g. neural network(s)) of the system of FIG. 2.

FIG. 4 shows a process 400 for training the machine learning model(s), for example a neural network, of the system of FIG. 2. FIG. 4 will be discussed in relation to a neural network but other machine learning models may be used.

At step 402, data is input into the Neural Network. In an example, the Neural Network is configured to receive acoustic feature data of multiple frames and output sound class scores for a frame.

At step 404, the output of the Neural Network is compared with training data to determine a loss as determined using a loss function. For example, the outputted sound class scores for a frame are compared to ground truth (sound class labels) for a frame. A loss is calculated for one or more sound classes, preferably a loss is calculated for each of the sound classes.

At step 406, the loss is back propagated. Following the back propagation, the weightings of the Neural Network are updated at step 408.

In an example, a loss function comprising the following features is used to determine a loss. The loss function directly optimises the classification of multi-frame events and/or scenes without resorting to an additional optimisation stage rather than considering only the classification of each short-time audio frame individually.

An example loss function for training the machine learning model(s) of the system of FIG. 2 may be the categorical cross-entropy:

$$\Sigma_i y_i \log x_i$$

wherein i represents a frame, $y_i$ is a sound class label for frame i, and $x_i$ represents one or more sound class scores for frame i output by the recurrent neural network. $y_i$ may be ground truth and may be a vector comprising labels for each sound class. In this example, the machine learning models may be one or more neural network.

Another example loss function for training the machine learning model(s) of the system of FIG. 2 may have a number of properties:

a) A loss value for incorrectly recognising a frame as having a target sound class when the ground truth label of the frame is a non-target sound class.

b) The loss value for a sound class goes toward zero as more frames having that sound class label are correctly recognised.
c) The loss value for temporally consistent detections on the sound class are less than the temporally inconsistent detections. In other words, chaotic activations are penalized.
d) For target classes, any false activation of the other target classes must also be penalized (missed detections are preferable to cross triggers).

In this example, the machine learning models may be one or more neural network.

Each of these criteria can be enforced with one or more specific penalty terms, each of which are explained in more detail below.

Non-Target Cross Entropy

The set of sound classes may comprise one or more target sound classes and one non-target sound class. A target sound class is a sound class that the described system is configured to recognise (for example "baby crying", "dog barking" or "female speaking"). The non-target sound class is a sound class that comprises all sound classes that are not target sound classes. If there are no audio event and/or scenes (that have a corresponding target sound class) in a frame then the frame will be classified as having a non-target sound class. The non-target sound class representative of an absence of each of the one or more target sound classes.

The non-target cross entropy term penalises incorrect and can be determined by:

$$\Sigma_{i=non\text{-}target\ sound\ class}\ y_i \log x_i$$

wherein i represents a frame having a ground truth of the non-target sound class representative of an absence of each of the one or more target sound classes, $y_i$ is a sound class label for frame i, and $x_i$ represents one or more sound class scores for frame i output by the recurrent neural network. $y_i$ may be ground truth and may be a vector comprising labels for each sound class.

Target Loss

For a class, in order to successfully recognise the sound event and/or scene associated with the class, it may not be necessary to correctly classify every frame. Rather, it may be sufficient to correctly classify only a percentage of frames associated with the sound event and/or scene. For example, for a sound event and/or scene that typically has a short time duration, it may be advantageous to correctly classify the majority of the frames having the class associated with the sound event and/or scene. For a sound event and/or scene that typically has a long time duration, correctly classifying only a small percentage of the frames having the class could be sufficient. For this purpose, a weighted pooling of the scores within a class can be used. Thus, a term of the loss function may determine:

$$\Sigma_j [(\Sigma_{i\ \in\ label_j}\ y_i) \log(\text{pool}_\beta(x_i, \forall i \in label_j))]$$

wherein, j represents a target sound class, $i \in label_j$ represents a frame that has been classified as sound class j, $y_i$ is a sound class label for frame i (i.e. the ground truth), $x_i$ represents one or more sound class scores for frame i output by the recurrent neural network, and $\text{pool}_\beta(x_i, \forall i \in label_j)$ is a function of sound class scores and comprises a parameter $\beta$.

The $\text{pool}\beta()$ is the pooling function combining a number of outputs, may be defined as:

$$\text{pool}_\beta(x_i, \forall i \in label_j) = \frac{\sum_i x_i e^{\beta x_i}}{\sum_i e^{\beta x_i}}$$

which is equivalent to average pooling for $\beta=0$ and max-pooling when $\beta \to \inf$.

With a correct $\beta$ parameter, this loss function will lead to high values when no frames create a detection, and much lower values when sufficient number of frames have a detection, leaving the other frames unconstrained.

Smoothness Loss

As discussed above, temporally continuous classifications (i.e. smooth) are preferable to temporally inconsistent classifications as they are more likely to be considered as a recognition. Thus, a loss term that penalizes non-smooth changes in the class on the label can be used as determined below:

$$\Sigma_{i=target\ sound\ class}\ y_i \log(1-(x_i-(x_{i-1}+x_{i+1})/2)^2)$$

wherein i represents a frame, $y_i$ represents a sound class label for frame i, $x_i$ represents one or more sound class scores for frame i output by the recurrent neural network, $x_{i-1}$ represents one or more sound class scores for frame i−1 output by the recurrent neural network, wherein the frame i−1 is a frame that has a position in the sequence preceding the frame i; and $x_{i+1}$ represents one or more sound class scores for frame i+1 output by the recurrent neural network, wherein frame i+1 is a frame that has a position in the sequence after the frame i.

Cross-Trigger Loss

In an example, there is a loss term that penalises a frame being classified as more than one class. The loss term increases as other further classes are triggered on the target label (except the world class, since missed detections are not as important). An example term performing such a function is:

$$-\Sigma_j [\Sigma_{i\ \in\ label_j}\ y_i \log(1-\text{pool}_{max}(x_{i,\ k},\ \forall k \neq j))]$$

wherein j represents a target sound class, $i \in label\ j$ represents a frame i having a ground truth of a target sound class j, $y_i$ represents a sound class label for frame i, $x_i$ represents one or more sound class scores for frame i output by the recurrent neural network, $\text{pool}_{max}(x_{i,\ k},\ \forall k \neq c)$ represents a highest sound class score of $x_i$ that is not a sound class score for class c.

The invention claimed is:

1. A method for recognising at least one of a non-verbal sound event and a scene in an audio signal comprising a sequence of frames of audio data, the method comprising:
for each frame of the sequence:
processing the frame of audio data to extract multiple acoustic features for the frame of audio data; and
classifying the acoustic features to classify the frame by determining, for each of a set of sound classes, a score that the frame represents the sound class, wherein classifying the acoustic features comprises classifying the frame of audio data using a set of first classifiers;
processing the sound class scores for multiple frames of the sequence of frames to generate, for each frame, a sound class decision for each frame, wherein processing the sound class scores includes applying a temporal structure constraint to the sound class scores to generate the sound class decision, wherein applying the temporal structure constraint comprises processing the sound class scores to determine whether a consistency constraint is met over the sequence of frames and processing the sound class scores using a second classifier, wherein the second classifier is a neural network; and processing the sound class decisions for the sequence of frames to recognise the at least one of a non-verbal sound event and a scene.

2. The method of claim 1, wherein classifying the acoustic features comprises classifying the frame of audio data using a set of first classifiers, and wherein applying the temporal structure constraint comprises processing the sound class scores using a Viterbi optimal path search algorithm.

3. The method of claim 1, wherein the set of first classifiers comprises a set of neural network classifiers.

4. The method of claim 1, wherein processing the frame of audio data to extract the acoustic features for the frame of audio data comprises determining a feature vector defining the acoustic features for the frame of audio data.

5. The method of claim 1, wherein the frame of audio data comprises time domain audio data for a time window, and wherein processing the frame of audio data to extract the acoustic features for the frame of audio data comprises transforming the frame of audio data into frequency domain audio data.

6. The method of claim 1 wherein processing the frame of audio data to extract multiple acoustic features for the frame of audio data comprises processing the frame of audio data using a feature extraction neural network to extract the acoustic features for the frame.

7. The method of claim 1, wherein prior to said classifying the acoustic features to classify the frame, the method comprises concatenating the multiple acoustic features for the frame of audio data with multiple acoustic features for an adjacent frame of audio data in the sequence.

8. The method of claim 1, further comprising adjusting the sound class scores for multiple frames of the sequence of frames based on one or more of:
knowledge about one or more of the sound classes; and
knowledge about an environment in which the audio data was captured.

9. The method of claim 1, wherein processing the sound class scores for multiple frames of the sequence of frames to generate, for each frame, a sound class decision for each frame comprises using an optimal path search algorithm across more than one frame.

10. The method of claim 9, wherein the optimal path search algorithm is a Viterbi algorithm.

11. The method of claim 1, wherein processing the sound class scores for multiple frames of the sequence of frames to generate, for each frame, a sound class decision for each frame comprises:
filtering the sound class scores for the multiple frames to generate a smoothed score for each frame; and
comparing each smooth score to a threshold to determine a sound class decision for each frame.

12. The method of claim 1, wherein processing the class decisions for the sequence of frames to recognise the at least one of a non-verbal sound event and scene further comprises determining a start and an end time of the at least one of a non-verbal sound event and a scene.

13. A non-transitory data carrier carrying processor control code which when running on a device causes the device to perform the method of claim 1.

14. A computer system configured to implement the method of claim 1.

15. A consumer electronic device comprising the computer system of claim 14.

16. A system for recognising at least one of a non-verbal sound event and a scene in an audio signal comprising a sequence of frames of audio data, the system comprising a microphone to capture the audio data and one or more processors, wherein the system is configured to:
for each frame of the sequence:
process the frame of audio data to extract multiple acoustic features for the frame of audio data; and
classify the acoustic features to classify the frame by determining, for each of a set of sound classes, a score that the frame represents the sound class, wherein classifying the acoustic features comprises classifying the frame of audio data using a set of first classifiers;
process the sound class scores for multiple frames of the sequence of frames to generate, for each frame, a sound class decision for each frame, wherein processing the sound class scores includes applying a temporal structure constraint to the sound class scores to generate the sound class decision, wherein applying the temporal structure constraint comprises processing the sound class scores to determine whether a consistency constraint is met over the sequence of frames and processing the sound class scores using a second classifier, wherein the second classifier is a neural network; and
process the class decisions for the sequence of frames to recognise the at least one of a non-verbal sound event and scene.

17. A sound recognition device for recognising at least one of a non-verbal sound event and scene in an audio signal comprising a sequence of frames of audio data, the sound recognition device comprising:
a microphone to capture the audio data; and
a processor configured to:
receive the audio data from the microphone; and
for each frame of the sequence:
process the frame of audio data to extract multiple acoustic features for the frame of audio data; and
classify the acoustic features to classify the frame by determining, for each of a set of sound classes, a score that the frame represents the sound class, wherein classifying the acoustic features comprises classifying the frame of audio data using a set of firest classifiers;
process the sound class scores for multiple frames of the sequence of frames to generate, for each frame, a sound class decision for each frame, wherein processing the sound class scores includes applying a temporal structure constraint to the sound class scores to generate the sound class decision, wherein applying the temporal structure constraint comprises processing the sound class scores to determine whether a consistency constraint is met over the sequence of frames and processing the sound class scores using a second classifier, wherein the second classifier is a neural network; and
process the class decisions for the sequence of frames to recognise the at least one of a non-verbal sound event and scene.

18. The method of claim 1, wherein applying the temporal structure constraint comprises one or more of (i) requiring that a specified number of proportion of the sequence of frames have a similar sound class score; (ii) requiring that a specified number or proportion of the sequence of frames have the same sound class decisions; (iii) requiring that a consistency metric is satisfied for the sequence of frames; or (iv) processing the sound class scores of the sequence of frames using a process which is responsive to a history of the sound class scores.

19. A method for recognising at least one of a non-verbal sound event and a scene in an audio signal comprising a sequence of frames of audio data, the method comprising:

for each frame of the sequence:
processing the frame of audio data to extract multiple acoustic features for the frame of audio data; and
classifying the acoustic features to classify the frame by determining, for each of a set of sound classes, a score that the frame represents the sound class, wherein classifying the acoustic features comprised classifying the frame of audio data using a set of first classifiers;
processing the sound class scores for multiple frames of the sequence of frames to generate, from each frame, wherein processing the sound class scores includes applying a temporal structure constraint to the sound class scores to generate the sound class decision, wherein applying the temporal structure constraint comprises processing the sound class scores to determine whether a consistency constraint is met over the sequence of frames, and processing the sound class scores using Viterbi optimal path search algorithm; and
processing the sound class decisions for the sequence of frames to recognise the at least one of a non-verbal sound event and a scene.

\* \* \* \* \*

UNITED STATES PATENT AND TRADEMARK OFFICE
CERTIFICATE OF CORRECTION

| | |
|---|---|
| PATENT NO. | : 11,587,556 B2 |
| APPLICATION NO. | : 16/594624 |
| DATED | : February 21, 2023 |
| INVENTOR(S) | : Christopher James Mitchell |

It is certified that error appears in the above-identified patent and that said Letters Patent is hereby corrected as shown below:

In the Claims

In Column 16, Claim 1, Line 59, delete "classifiers:" and insert -- classifiers; --, therefor.

In Column 18, Claim 17, Line 45, delete "firest" and insert -- first --, therefor.

In Column 18, Claim 18, Line 63, delete "of" and insert -- or --, therefor.

In Column 19, Claim 19, Line 13, delete "comprised" and insert -- comprises --, therefor.

In Column 19, Claim 19, Line 16, delete "from" and insert -- for each frame, a sound class decision for each frame, --, therefor.

Signed and Sealed this
Fifth Day of December, 2023

Katherine Kelly Vidal
*Director of the United States Patent and Trademark Office*